UNITED STATES PATENT OFFICE 2,573,513

2-NAPHTHYL J-ACID AND ITS METHOD OF PREPARATION

Vsevolod Tulagin, Phillipsburg, N. J., and Willy A. Schmidt, Easton, Pa., assignors to General Aniline & Film Corporation, New York, N. Y., a corporation of Delaware No Drawing. Application February 25, 1948, Serial No. 10,925

2 Claims. (Cl. 260—509)

The present invention relates to 4-hydroxy-7-(2'-naphthyl)-amino-2-naphthalene sulfonic acid, the salts thereof, and to a method of preparing the same.

J-acid or 4-hydroxy-7-amino-2-naphthalene sulfonic acid and its N-phenyl derivatives have been extensively studied by the art. These products are well known dyestuff intermediates, finding extensive use as coupling components in the preparation of azo dyes. The phenyl J-acids suffer from the disadvantage that they are highly unstable and therefore difficult to prepare and store in a chemically pure state. Furthermore they are insoluble in acids and hence cannot be used in reactions carried out in an acid medium. These objections to the N-phenyl J-acids have mitigated against the use of these highly desirable compounds in the preparation of dyestuffs.

We have now devised a method for the preparation of 2-naphthyl J-acid, a compound heretofore uninvestigated, and have discovered that this product has properties which are far superior to the properties of the N-phenyl J-acids. For instance, 2-naphthyl J-acid is a stable intermediate easily obtained in a chemically pure condition. When used as a coupler for the synthesis of dyes, it yields brilliant shades showing a marked bathochromatic shift in the transmission spectrum when compared with analogous dyes obtained from phenyl J-acid or its derivatives. In addition, dyes obtained from 2-naphthyl J-acid possess improved light stability and greater substantivity toward organic fibers, gelatin and other organic coatings than dyes produced from phenyl J-acids.

It is accordingly an object of the present invention to provide a method for the preparation of 2-naphthyl J-acid.

A further object is 2-naphthyl J-acid and the salts thereof.

Other and further important objects of the invention will become apparent as the description proceeds.

2-naphthyl J-acid has the following formula:

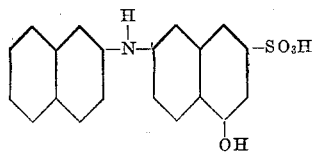

The product may be isolated and used in the form of the free acid or in the form of a salt such as an alkali metal salt, i. e., sodium, potassium or the like, or ammonium or of an organic base such as pyridine, quinoline, morpholine, and the like.

2-naphthyl J-acid is prepared by heating 2-naphthylamine and a water soluble sulfite or bisulfite in an aqueous medium with J-acid. Suitable water soluble sulfites are sodium sulfite, ammonium bisulfite, sodium meta-bisulfite, and the like. Preferably the J-acid is added portionwise to the reaction mixture of the 2-naphthylamine and the sulfite with heating for a few hours between each addition until the full amount of the J-acid has been incorporated in the reaction medium. The mixture is then heated overnight, filtered, and the hot press cake worked up to yield the crude 2-naphthyl J-acid.

The crude product may be purified by heating it in a mixture of glacial acetic acid and pyridine and precipitating the pyridine salt from the hot solution by cooling. The pure free 2-naphthyl J-acid may be isolated by dissolving the pyridine salt in an alkali and decomposing the salt by a strong mineral acid such as hydrochloric, sulfuric, and the like.

The 2-naphthyl J-acid as stated is a valuable intermediate for the preparation of azo dyes.

The following example serves to illustrate the invention, but it is to be understood that the invention is not restricted thereto. The parts are by weight unless otherwise stated.

Into a suitable vessel equipped with a rapid stirring apparatus, a reflux condenser and a heating element, are placed 525 parts of 2-naphthylamine, 1400 parts of hot water and 665 parts of sodium meta-bisulfite. The mixture is heated to boiling and refluxed for 15 minutes.

100 parts of J-acid (the inner salt of commerce) are introduced and the mixture is refluxed for 2 hours. Another 100 parts of J-acid are then introduced and the mixture again refluxed for 2 hours. The addition is repeated in the above fashion until a total of 500 parts of J-acid have been added. The resultant suspension is then refluxed overnight.

The hot mixture is filtered, taking off as much of the liquid as possible. The wet press cake is returned to the reaction vessel and extracted at 60–80° C. with a mixture of 2000 parts of water and 500 parts of 30% sodium chloride solution. The insoluble solid is collected by filtration and pressed as dry as possible. The press cake is returned to the vessel and triturated with a mixture consisting of 3000 parts of water and 2000 parts of toluene at 70–80° C. with vigorous agitation.

Concentrated ammonium hydroxide solution is then added until the aqueous phase is distinctly basic to phenolphthalein. When all of the solid has gone into solution, the agitator is stopped and, after a suitable interval, the phases are separated. The aqueous phase is re-extracted with 1000 parts of toluene and is then diluted to a total of 6000 parts. Sodium chloride solution (1000 parts of 30%) is added and the clear liquid is neutralized with acetic acid and diluted to a total volume of 8000 parts. The precipitate, which separates on standing and cooling, is collected by filtration and washed with a little ice water.

The wet press cake is dissolved in 8000 parts of boiling water and decolorized with activated charcoal. The filtrate is treated with 200 parts of concentrated hydrochloric acid while being maintained at the boiling point. The resulting suspension is kept hot for one-half hour and is then filtered. The solid so obtained is washed with water until the wash water no longer runs soapy, and is then dried to yield crude 2-naphthyl J-acid.

The crude product is suspended in 2000 parts of boiling glacial acetic acid to which 800 parts of pyridine are added. The resulting hot solution is maintained at 90–100° C. for a period of 1 to 2 hours, during which time the crystallized pyridine salt of 2-naphthyl J-acid separates as a pale yellow salt. The precipitate is removed by filtration, washed with acetic acid and dried. There is thus obtained 240 parts of pure dry pyridine salt of 2-naphthyl J-acid. The free acid may be isolated therefrom by dissolving the pyridine salt in an alkali such as sodium hydroxide solution and precipitating the acid by means of hydrochloric acid.

We claim:
1. A compound selected from the class consisting of 2-naphthyl J-acid and its salts.
2. 2-naphthyl J-acid.

VSEVOLOD TULAGIN.
WILLY A. SCHMIDT.

REFERENCES CITED

The following references are of record in the file of this patent:

UNITED STATES PATENTS

| Number | Name | Date |
|---|---|---|
| 537,511 | Weinberg | Apr. 16, 1895 |
| 616,123 | Levinstein et al. | Dec. 20, 1898 |
| 649,714 | Bammann et al. | May 15, 1900 |
| 2,347,042 | Fleischhauer et al. | Apr. 18, 1944 |

FOREIGN PATENTS

| Number | Country | Date |
|---|---|---|
| 254,510 | Germany | of 1912 |